(12) United States Patent
Kado et al.

(10) Patent No.: US 9,823,644 B2
(45) Date of Patent: Nov. 21, 2017

(54) NUMERICAL CONTROL DEVICE AND NUMERICAL CONTROL SYSTEM

(75) Inventors: Yuya Kado, Tokyo (JP); Masaki Ryu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 501 days.

(21) Appl. No.: 14/397,620

(22) PCT Filed: Jul. 17, 2012

(86) PCT No.: PCT/JP2012/068114
§ 371 (c)(1),
(2), (4) Date: Oct. 28, 2014

(87) PCT Pub. No.: WO2014/013550
PCT Pub. Date: Jan. 23, 2014

(65) Prior Publication Data
US 2015/0127140 A1    May 7, 2015

(51) Int. Cl.
*G05B 19/19*    (2006.01)
*G05B 19/4155*    (2006.01)

(52) U.S. Cl.
CPC ......... *G05B 19/19* (2013.01); *G05B 19/4155* (2013.01); *G05B 2219/35472* (2013.01); *G05B 2219/35581* (2013.01)

(58) Field of Classification Search
CPC .............. G05B 19/19; G05B 19/4155; G05B 2219/35581; G05B 2219/35472
See application file for complete search history.

(56) References Cited

U.S. PATENT DOCUMENTS

| 4,980,627 A | 12/1990 | Joboji et al. |
| 6,167,325 A | 12/2000 | Kamiguchi et al. |

(Continued)

FOREIGN PATENT DOCUMENTS

| DE | 19535869 A1 | 4/1997 |
| DE | 19983984 T1 | 12/2002 |

(Continued)

OTHER PUBLICATIONS

Weck, M.: Werkzeugmaschinen 4. Automatisierung von Maschinen und Anlage. [Machine Tools 4. Automation of Machinery and Equipment.] Fifth, newly revised edition. Berlin: Springer, 2001. pp. 323 to 327.—ISBN 978-3-662-10924-3.

(Continued)

*Primary Examiner* — Nathan L Laughlin
(74) *Attorney, Agent, or Firm* — Sughrue Mion, PLLC; Richard C. Turner

(57) ABSTRACT

A numerical control device includes: a switching unit switching between a first processing mode in which a position command for an amplifier is generated by performing interpolation process and acceleration/deceleration process on a program command in a machining program, and a second processing mode in which a position command every intra-amplifier control cycle for the amplifier is generated by performing acceleration/deceleration process on a command generated every intra-amplifier control cycle, which is a control cycle in the amplifier; a normal analysis unit extracting movement data on a machine tool by analyzing the program command when operating in the first processing mode; an interpolation processing unit obtaining first interpolated data by performing the interpolation process on the movement data when operating in the first processing mode; and a fast analysis unit extracting interpolated movement (Continued)

data as second interpolated data by analyzing the program command when operating in the second processing mode.

5 Claims, 6 Drawing Sheets

(56) References Cited

U.S. PATENT DOCUMENTS

| | | | |
|---|---|---|---|
| 6,731,090 B1 | 5/2004 | Tanaka et al. | |
| 7,257,578 B2 | 8/2007 | Maeda | |
| 2004/0122549 A1 | 6/2004 | Otsuki et al. | |
| 2006/0178770 A1* | 8/2006 | Egawa | B23K 26/08 700/166 |
| 2009/0153092 A1* | 6/2009 | Hosokawa | G05B 19/19 318/591 |
| 2010/0305758 A1 | 12/2010 | Nishi et al. | |

FOREIGN PATENT DOCUMENTS

| | | |
|---|---|---|
| JP | 63-26707 A | 2/1988 |
| JP | 63-105864 A | 5/1988 |
| JP | 63-163508 A | 7/1988 |
| JP | 2-259911 A | 10/1990 |
| JP | 6-35096 B2 | 5/1994 |
| JP | 6-332512 A | 12/1994 |
| JP | 7-72913 A | 3/1995 |
| JP | 9-146618 A | 6/1997 |
| JP | 9-269808 A | 10/1997 |
| JP | 10-214108 A | 8/1998 |
| JP | 10-301614 A | 11/1998 |
| JP | 11-345015 A | 12/1999 |
| JP | 2003-186515 A | 7/2003 |
| JP | 2004-21516 A | 1/2004 |
| JP | 2004-265024 A | 9/2004 |
| JP | 2006-72399 A | 3/2006 |
| JP | 2006-236243 A | 9/2006 |
| JP | 2006-350768 A | 12/2006 |
| JP | 2007-200063 A | 8/2007 |
| JP | 2007-249903 A | 9/2007 |
| JP | 2010-277425 A | 12/2010 |
| JP | 2011-170609 A | 9/2011 |
| WO | 01/44882 A1 | 6/2001 |

OTHER PUBLICATIONS

Communication dated Feb. 3, 2016, issued by the German Patent and Trademark Office in corresponding German Application No. 11 2012 006 342.2.

International Search Report of PCT/JP2012/068114, dated Oct. 23, 2012. [PCT/ISA/210].

Communication dated Oct. 29, 2015 from the State Intellectual Property Office of the P.R.C. in counterpart application No. 201280074730.5.

* cited by examiner

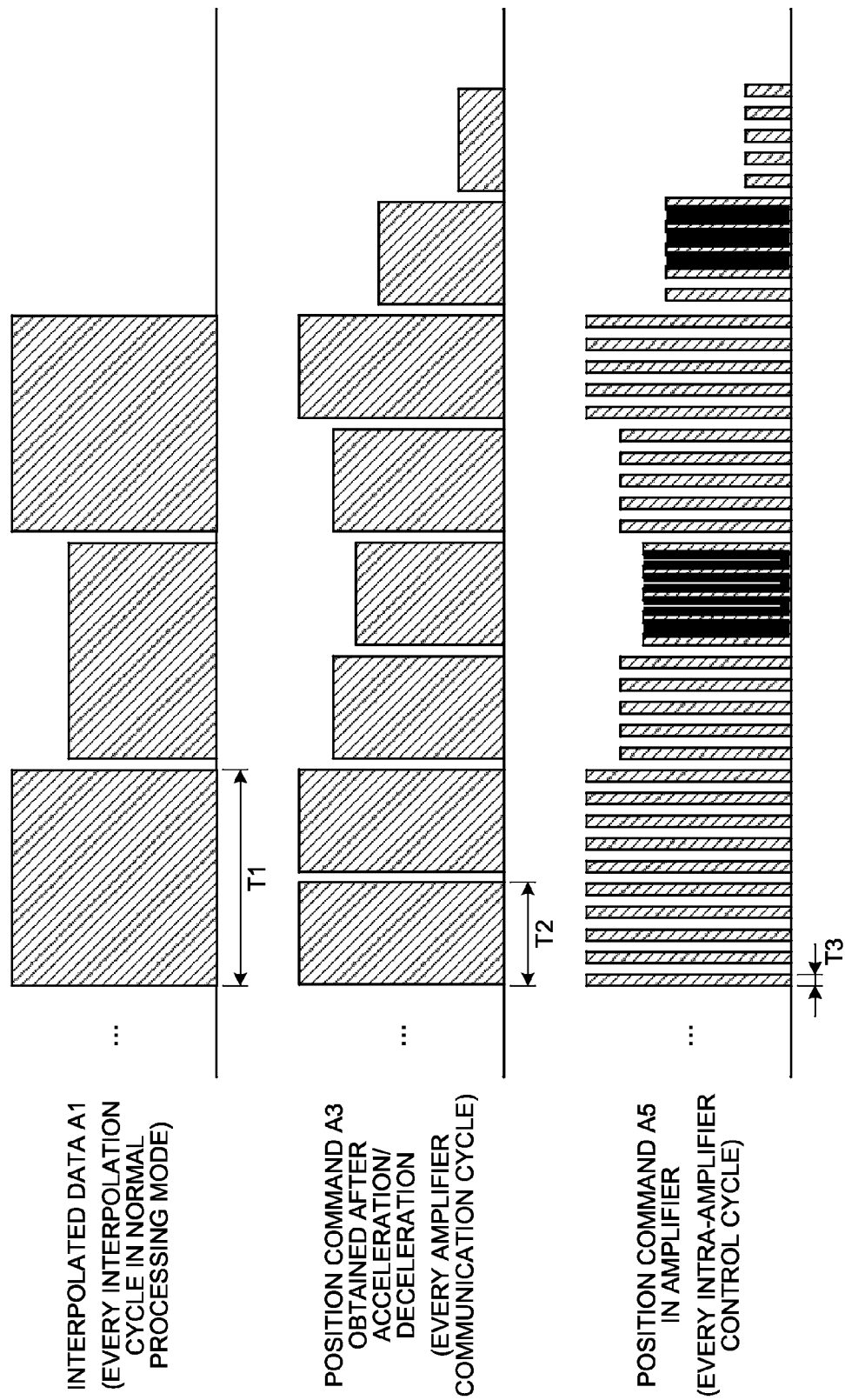

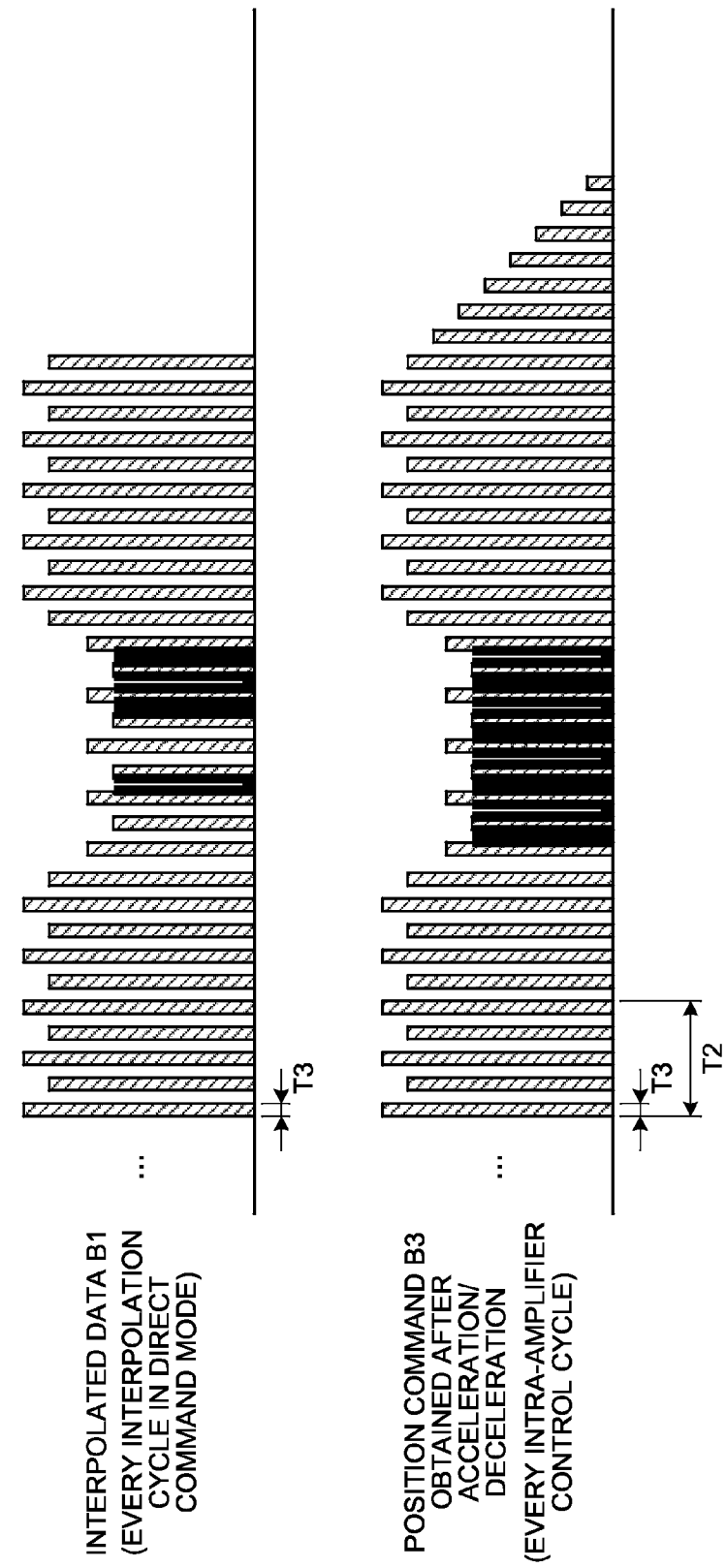

NUMERICAL CONTROL DEVICE AND NUMERICAL CONTROL SYSTEM

CROSS REFERENCE TO RELATED APPLICATIONS

This application is a National Stage of International Application No. PCT/JP2012/068114 filed Jul. 17, 2012, the contents of all of which are incorporated herein by reference in their entirety.

FIELD

The present invention relates to a numerical control device and a numerical control system that numerically control a machine tool by using a machining program.

BACKGROUND

A typical conventional numerical control device is such that position commands generated by performing an analysis process, an interpolation process, and an acceleration/deceleration process on program commands in a machining program are output to an amplifier. The amplifier then performs servo control of the motor position in accordance with the received position commands.

Factors for determining a fast machining performance in such a numerical control device include, for example, the machining program analysis capability and the interpolation processing capability of the numerical control device, the amplifier communication cycle between the numerical control device and the amplifier, and the intra-amplifier control cycle.

Normally, the machining program analysis capability, the interpolation processing capability, the amplifier communication cycle, and the intra-amplifier control cycle are bottlenecks in the fast machining performance in the order they appear in this sentence. Therefore, with fast machining, due to the bottlenecks, the performance of the intra-amplifier control cycle cannot be taken advantage of to the full.

In order to solve such a problem, in the method described in Patent Literature 1, the binary data generating device, which is a device external to the numerical control device, performs interpolation every position control cycle of servo control in advance on the basis of the CAD data and cutting conditions and then directly inputs, to the servo control unit, a movement command in binary form generated by performing an acceleration/deceleration process and a feed-forward process. Consequently, the numerical control device can omit the machining program analysis and the interpolation process, and therefore the bottlenecks described above can be removed. Thus, the position control performance of servo control can be taken advantage of to the full.

CITATION LIST

Patent Literature

Patent Literature 1: WO2001/044882 (FIG. 8)

SUMMARY

Technical Problem

However, with the conventional method described above, a process, such as the acceleration/deceleration process, that depends on motor characteristics and machine tool characteristics is also performed in advance in an external device rather than the numerical control device; therefore, the generated binary data cannot be used with other motors and machine tools. Moreover, there is a problem in that it is necessary to input data containing motor characteristics and machine tool characteristics into the binary data generating device.

Moreover, in the numerical control device, the machining program analysis process and the process in the machine control unit are completely omitted; therefore, it is difficult to realize the function of using information (such as feedback information from the motor) that changes in real time. Examples of such a function include a machine error correction process. There is a method of incorporating the machine error correction process into a servo control unit that can refer to real-time information; however, the machine error correction process requires complex calculations in some cases and thus there is a problem of an increase in the load on the servo control unit for which a reduction in the load is desirable.

Moreover, because binary data is used, there is a problem in that the method of generating binary data is limited. Furthermore, because binary data and a normal machining program are different pieces of data, there is a problem in that program control becomes complicated.

The present invention has been achieved in view of the above and an object of the present invention is to obtain a numerical control device and a numerical control system that can easily perform high-speed and accurate machining.

Solution to Problem

In order to solve the above problems and achieve the object, the present invention relates to a numerical control device including: a switching unit that switches between a first processing mode in which a first position command for an amplifier, which drives a motor, is generated by performing an interpolation process and an acceleration/deceleration process on a program command in a program, and a second processing mode in which a position command for the amplifier is generated as a second position command generated every intra-amplifier control cycle by performing an acceleration/deceleration process on a command that is generated every intra-amplifier control cycle, which is a control cycle in the amplifier; a first analysis unit that extracts movement data on a machine tool by analyzing the program command when operating in the first processing mode; an interpolation processing unit that obtains first interpolated data by performing the interpolation process on the movement data when operating in the first processing mode; a second analysis unit that extracts interpolated movement data as second interpolated data by analyzing the program command when operating in the second processing mode; an acceleration/deceleration processing unit that performs the acceleration/deceleration process on the first interpolated data when operating in the first processing mode, and performs the acceleration/deceleration process on the second interpolated data when operating in the second processing mode; and a position command generating unit that generates a first position command for the amplifier by using first interpolated data on which the acceleration/deceleration process is performed when operating in the first processing mode, and generates a second position command for the amplifier by using second interpolated data on which the acceleration/deceleration process is performed when operating in the second processing mode.

Advantageous Effects of Invention

The numerical control device and the numerical control system according to the present invention have an effect where high-speed and accurate machining can be easily performed.

BRIEF DESCRIPTION OF DRAWINGS

FIG. 6 is a diagram illustrating an example of position commands in the normal processing mode.

FIG. 7 is a diagram illustrating an example of position commands in the direct command mode.

DESCRIPTION OF EMBODIMENTS

Exemplary embodiments of a numerical control device and a numerical control system according to the present invention will be explained below in detail with reference to the drawings. This invention is not limited to the embodiments.

Embodiment.

Figure 1:
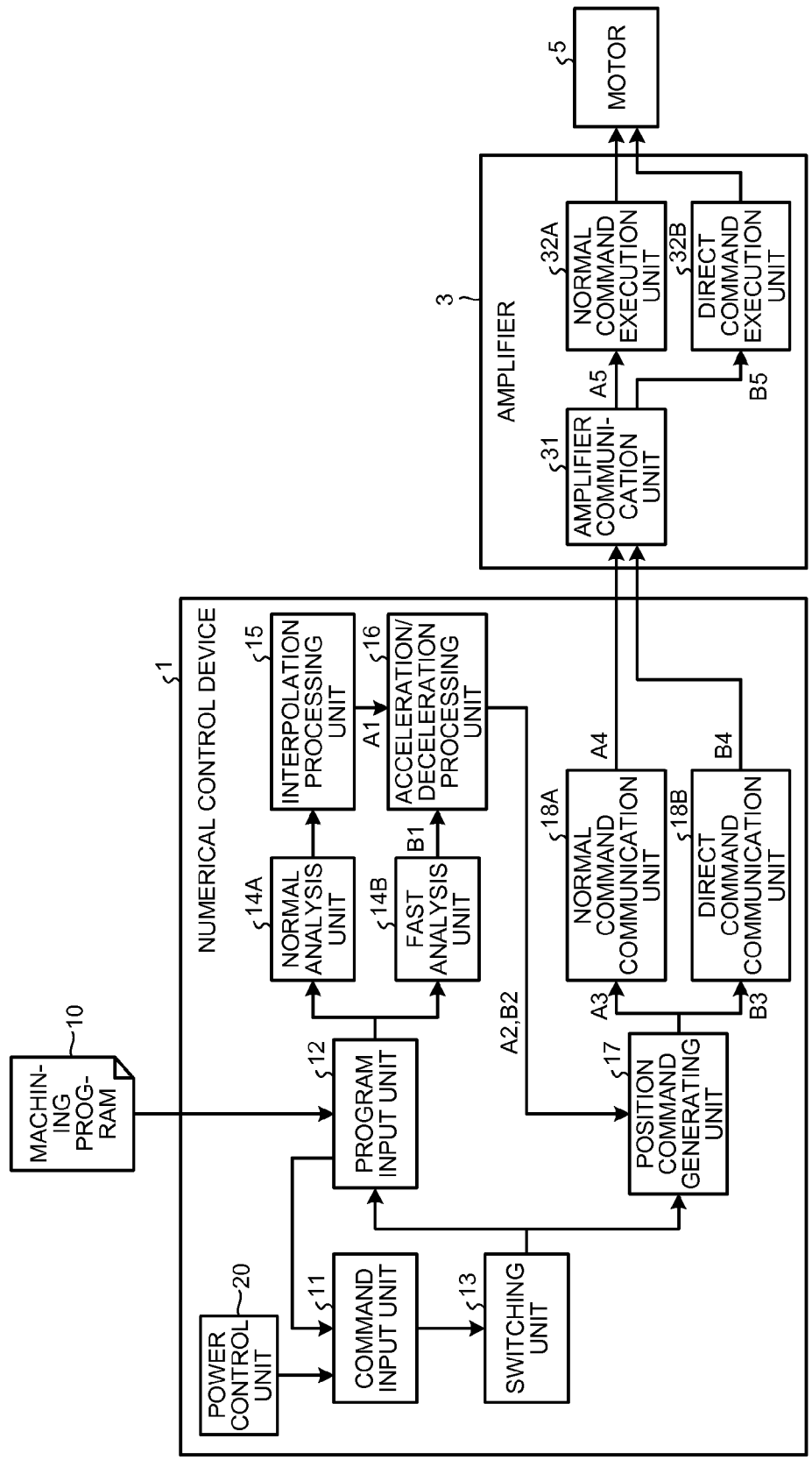
FIG. 1 is a diagram illustrating the configuration of a numerical control system that includes a numerical control device according to an embodiment.

FIG. 1 is a diagram illustrating the configuration of a numerical control system that includes a numerical control device according to an embodiment. The numerical control system includes a numerical control device 1, one or a plurality of amplifiers 3, and one or a plurality of motors 5. The numerical control device 1 is, for example, a computer that numerically controls (NC: Numerical Control) a machine tool (not illustrated) via the amplifier 3 and the motor 5.

The numerical control device 1 in the present embodiment switches between processing methods (operation modes) for each command in a machining program 10 in which normal machining program commands (such as G codes) and interpolated data (hereinafter, direct command) generated every intra-amplifier control cycle are mixed. When the machine tool is numerically controlled by using a direct command, the numerical control device 1 performs an acceleration/deceleration process on the direct command generated every intra-amplifier control cycle.

The numerical control device 1 includes a command input unit 11, a program input unit 12, a switching unit 13, a normal analysis unit (analysis unit for analyzing the machining program 10) 14A, a fast analysis unit (fast machining program analysis unit) 14B, an interpolation processing unit 15, an acceleration/deceleration processing unit 16, a position command generating unit 17, a normal command communication unit 18A, a direct command communication unit 18B, and a power control unit 20.

When information indicating a direct command (direct command information) or information indicating a normal process (normal processing information) is input, the command input unit 11 sends the direct command information or the normal processing information to the switching unit 13. The direct command information is an initial mode parameter indicating the direct command mode or a mode switching command (such as a G05P4 command) for specifying and switching to the direct command mode. The normal processing information is an initial mode parameter indicating the normal processing mode or a mode switching command (such as a G05P0 command) for specifying and switching to the normal processing mode.

For example, when the power is turned on, the initial mode parameter is input from the power control unit 20, which controls the power, to the command input unit 11. The mode switching command is stored in the machining program 10.

The program input unit 12 having the machining program 10 input therein extracts the mode switching command from the machining program 10 and sends it to the command input unit 11. Moreover, the program input unit 12 sends the input machining program 10 to the normal analysis unit 14A or the fast analysis unit 14B. The program input unit 12 sends the machining program 10 to any one of the normal analysis unit 14A and the fast analysis unit 14B in accordance with an instruction from the switching unit 13. The machining program 10 is a program that is used when a workpiece to be machined by the machine tool is machined and includes position commands for the machine tool and the like. The machining program 10 according to the present embodiment is configured to include direct commands for operating the numerical control device 1 in the direct command mode and normal program commands for operating the numerical control device 1 in the normal processing mode.

The switching unit 13 controls the program input unit 12 and the position command generating unit 17 on the basis of the direct command information or the normal processing information. When the direct command information is sent from the command input unit 11, the switching unit 13 switches the numerical control device 1 to the direct command mode. When the normal processing information is sent from the command input unit 11, the switching unit 13 switches the numerical control device 1 to the normal processing mode.

When the direct command information is sent from the command input unit 11, the switching unit 13 causes the machining program 10 to be sent from the program input unit 12 to the fast analysis unit 14B. In contrast, when the normal processing information is sent from the command input unit 11, the switching unit 13 causes the machining program 10 to be sent from the program input unit 12 to the normal analysis unit 14A.

When the direct command information is sent from the command input unit 11, the switching unit 13 causes a position command generated by the position command generating unit 17 to be sent from the position command generating unit 17 to the direct command communication unit 18B. In contrast, when the normal processing information is sent from the command input unit 11, the switching unit 13 causes a position command generated by the position command generating unit 17 to be sent from the position command generating unit 17 to the normal command communication unit 18A.

The normal analysis unit 14A operates in the case of the normal processing mode. In the case of the normal processing mode, the machining program 10 is sent from the program input unit 12 to the normal analysis unit 14A. The normal analysis unit 14A extracts movement data on the machine tool, such as the start point (start point coordinates), the end point (end point coordinates), and the feed rate, by analyzing the machining program 10 block by block. The normal analysis unit 14A transmits the extracted movement data to the interpolation processing unit 15 as an analysis result.

The interpolation processing unit 15 performs the interpolation process to obtain the amount of feed (such as the amount a servo shaft is fed in machining) during every interpolation cycle (during every interpolation cycle T1 in the normal processing mode, which will be described later) on the basis of the movement data (such as the start point, the end point, and the feed rate) transmitted from the normal analysis unit 14A. The interpolation processing unit 15 transmits, to the acceleration/deceleration processing unit 16, the feed amount data obtained after the interpolation as interpolated data A1.

The fast analysis unit 14B operates in the case of the direct command mode and analyzes the machining program 10 at high speed. The fast analysis unit 14B is set such that it can analyze the machining program 10 at a higher speed than the normal analysis unit 14A, for example, by limiting the functions and processes when compared with the normal analysis unit 14A.

In the case of the direct command mode, the machining program 10 is sent from the program input unit 12 to the fast analysis unit 14B. The fast analysis unit 14B extracts interpolated data by analyzing the machining program 10 block by block as interpolated data generated every intra-amplifier control cycle (intra-amplifier control cycle T3, which will be described later). The fast analysis unit 14B transmits extracted interpolated data B1 to the acceleration/deceleration processing unit 16 as an analysis result. The interpolated data B1 extracted by the fast analysis unit 14B is generated, for example, every intra-amplifier control cycle T3. The intra-amplifier control cycle T3 is a processing cycle that is used when data is handled in the amplifier 3. For example, the intra-amplifier control cycle T3 is a shorter cycle than the interpolation cycle T1 in the normal processing mode.

When the acceleration/deceleration processing unit 16 receives the interpolated data A1 from the interpolation processing unit 15, the acceleration/deceleration processing unit 16 performs the acceleration/deceleration process on the basis of the interpolated data A1. The acceleration/deceleration processing unit 16 performs a process of dividing the interpolated data A1 into a plurality of position commands in order to convert the interpolated data A1 into the position commands for moving a control target at a desired acceleration or deceleration. The acceleration/deceleration processing unit 16 transmits, to the position command generating unit 17, interpolated data A2 obtained after the acceleration/deceleration.

When the acceleration/deceleration processing unit 16 receives the interpolated data B1 generated every intra-amplifier control cycle T3 from the fast analysis unit 14B, the acceleration/deceleration processing unit 16 performs the acceleration/deceleration process similar to that in the normal processing mode described above on the basis of the interpolated data B1 generated every intra-amplifier control cycle T3.

For example, when the acceleration/deceleration processing unit 16 changes the direct command speed in accordance with a direct command (the interpolated data B1) for starting or stopping the motor 5, the acceleration/deceleration processing unit 16 performs the acceleration/deceleration process on the direct command. In the case of the direct command mode, the acceleration/deceleration processing unit 16 performs, on the direct command (the interpolated data B1), the acceleration/deceleration process corresponding to the characteristics of the amplifier 3 and the characteristics of the controlled device, such as a machine tool.

The acceleration/deceleration processing unit 16 may perform the acceleration/deceleration process on the direct command in accordance with a command from an external operation. The acceleration/deceleration processing unit 16 transmits, to the position command generating unit 17, interpolated data B2 obtained after the acceleration/deceleration.

The position command generating unit 17 sends a position command to any one of the normal command communication unit 18A and the direct command communication unit 18B in accordance with an instruction from the switching unit 13. When the position command generating unit 17 receives an instruction from the switching unit 13 to send a position command to the normal command communication unit 18A, the position command generating unit 17 is switched to the normal processing mode. In contrast, when the position command generating unit 17 receives an instruction from the switching unit 13 to send a position command to the direct command communication unit 18B, the position command generating unit 17 is switched to the direct command mode.

The position command generating unit 17 generates a position command A3 by using the interpolated data A2 obtained after the acceleration/deceleration and received from the acceleration/deceleration processing unit 16. At this point, the position command generating unit 17 calculates the amount of machine error correction by using the amount of feed (the interpolated data A2) obtained after the interpolation, the machine position (current position of the machine tool), and a preset parameter and generates a position command A3 while taking the calculated amount of machine error correction into consideration. The position command generating unit 17 may generate the position command A3 while taking a control error with respect to the amplifier 3 or a controlled device (such as a machine tool), which is obtained, for example, from a detector (not illustrated), into consideration.

The position command A3 generated by using the feed amount data A2 obtained after the acceleration/deceleration is a position command to be transmitted to the amplifier 3 and is sent to the normal command communication unit 18A in accordance with an instruction from the switching unit 13. The position command A3 is generated, for example, every amplifier communication cycle (amplifier communication cycle T2, which will be described later). The amplifier communication cycle T2 is a communication cycle in communication performed between the amplifier 3 and the numerical control device 1 and is, for example, a cycle that is shorter than the interpolation cycle T1 in the normal processing mode and is longer than the intra-amplifier control cycle T3.

Moreover, the position command generating unit 17 generates a position command B3 by using the interpolated data B2 obtained after the acceleration/deceleration and received from the acceleration/deceleration processing unit 16. At this point, in a similar manner to the case of the normal processing mode, the position command generating unit 17 calculates the amount of machine error correction on the basis of the amount of feed (the interpolated data B2)

obtained after the interpolation, the machine position (current position of the machine tool), and a preset parameter and generates the position command B3 while taking the calculated amount of machine error correction into consideration. The position command B3 generated by using the interpolated data B2 obtained after the acceleration/deceleration is a position command to be transmitted to the amplifier 3 and is sent to the direct command communication unit 18B in accordance with an instruction from the switching unit 13. The position command B3 is generated, for example, every intra-amplifier control cycle T3.

The normal command communication unit 18A transmits the position command A3 sent from the position command generating unit 17 to the amplifier 3 as a position command A4. The direct command communication unit 18B transmits the position command B3 sent from the position command generating unit 17 to the amplifier 3 as a plurality of position commands B4 each generated every intra-amplifier control cycle T3. The normal command communication unit 18A and the direct command communication unit 18B transmit the position commands A4 and B4, respectively, to the amplifier 3 every amplifier communication cycle T2.

The amplifier 3 includes an amplifier communication unit 31, a normal command execution unit 32A, and a direct command execution unit 32B. The amplifier communication unit 31 is connected to the normal command communication unit 18A and the direct command communication unit 18B. The amplifier communication unit 31 determines whether the received data is the position command A4 in the normal processing mode or the position command B4 in the direct command mode on the basis of the received data.

The amplifier communication unit 31 is connected to the normal command execution unit 32A and the direct command execution unit 32B. When the amplifier communication unit 31 receives the position command A4 in the normal processing mode, the amplifier communication unit 31 transmits the position command A4 to the normal command execution unit 32A as a position command A5. In contrast, when the amplifier communication unit 31 receives the position command B4 in the direct command mode, the amplifier communication unit 31 transmits the position command B4 to the direct command execution unit 32B as a position command B5. The amplifier communication unit 31 transmits the position command A5 to the normal command execution unit 32A every intra-amplifier control cycle T3 and transmits the position command B5 to the direct command execution unit 32B every intra-amplifier control cycle T3.

The normal command execution unit 32A performs position control on the motor 5 on the basis of the position command A5 (a command generated every intra-amplifier control cycle T3) received from the amplifier communication unit 31. The direct command execution unit 32B performs position control on the motor 5 on the basis of the position command B5 (a command generated every intra-amplifier control cycle T3) received from the amplifier communication unit 31.

The motor 5 is connected to the amplifier 3 and is driven by the amplifier 3. The motor 5 operates in accordance with a position command sent from the normal command execution unit 32A or the direct command execution unit 32B. Accordingly, the motor 5 moves tools and the like of the machine tool, whereby a workpiece is machined.

In this embodiment, an explanation has been given of a case where the switching unit 13 sends an operation-mode switching instruction to the position command generating unit 17; however, the switching unit 13 may not send an operation-mode switching instruction to the position command generating unit 17. In such a case, the position command generating unit 17 sends a position command to any one of the normal command communication unit 18A and the direct command communication unit 18B on the basis of the data sent from the acceleration/deceleration processing unit 16.

Specifically, when the position command generating unit 17 receives, from the acceleration/deceleration processing unit 16, the interpolated data A2 obtained after the acceleration/deceleration, the position command generating unit 17 generates the position command A3 and sends it to the normal command communication unit 18A. In contrast, when the position command generating unit 17 receives, from the acceleration/deceleration processing unit 16, the interpolated data B2 obtained after the acceleration/deceleration, the position command generating unit 17 generates the position command B3 and sends it to the direct command communication unit 18B. At this point, when the position command generating unit 17 receives interpolated data that is generated every cycle that is longer than a predetermined value, the position command generating unit 17 determines that the interpolated data A2 is received, and, when the position command generating unit 17 receives interpolated data that is generated every cycle that is shorter than a predetermined value, the position command generating unit 17 determines that the interpolated data B2 is received. For example, when the position command generating unit 17 receives interpolated data that is generated every interpolation cycle T1 in the normal processing mode, the position command generating unit 17 determines that the interpolated data A2 is received, and, when the position command generating unit 17 receives interpolated data that is generated every intra-amplifier control cycle T3, the position command generating unit 17 determines that the interpolated data B2 is received.

Figures 2, 3:
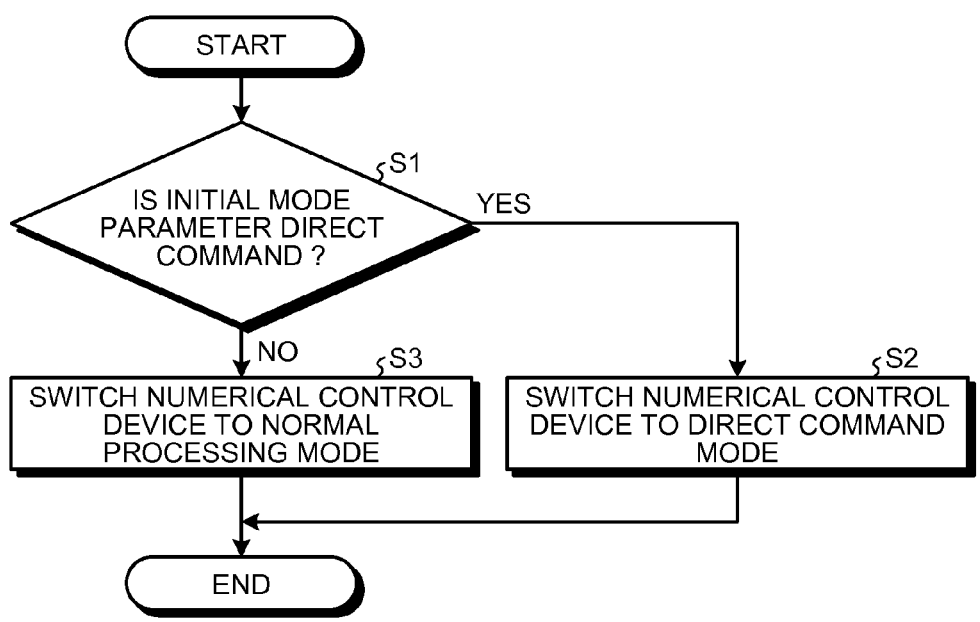
FIG. 2 is a diagram illustrating an example of a machining program.
FIG. 3 is a flowchart illustrating the operation processing procedure when the operation mode of the numerical control device is switched on the basis of the initial mode parameter.

FIG. 2 is a diagram illustrating an example of a machining program. The machining program 10 is created by using positioning commands (such as G00) for the machine tool, machining shape commands (such as G01 and G02), normal-processing-mode switching commands (such as G05P0), direct-command-mode switching commands (such as G05P4), machining shape commands by the direct commands, and the like.

The normal-processing-mode switching command is a command to turn off the direct command mode and the direct-command-mode switching command is a command to turn on the direct command mode. In FIG. 2, X, Z, and C indicate absolute command addresses and U, W, and H indicate incremental command addresses.

The switching unit 13 switches the operation of the numerical control device 1 to any of the normal processing mode and the direct command mode on the basis of the initial mode parameter or the mode switching command (G05P0, G05P4). The initial mode parameter is a parameter that determines which of the normal processing mode and the direct command mode is selected when the numerical control device 1 is turned on or reset. Any of the parameter for specifying the direct command mode and the parameter for specifying the normal processing mode is set to the numerical control device 1 in advance as the initial mode parameter.

FIG. 3 is a flowchart illustrating the operation processing procedure when the operation mode of the numerical control device is switched on the basis of the initial mode parameter. When the numerical control device 1 is turned on or reset, the initial mode parameter is input to the command input unit 11. This initial mode parameter is sent to the switching unit 13. The switching unit 13 determines whether the initial mode parameter is a direct command (Step S1).

When the initial mode parameter is a direct command (Yes at Step S1), the switching unit 13 switches the numerical control device 1 to the direct command mode (Step S2). In contrast, when the initial mode parameter is a normal processing command (No at Step S1), the switching unit 13 switches the numerical control device 1 to the normal processing mode (Step S3). After the numerical control device 1 is turned on or reset, machining using the machining program 10 is started.

Figure 4:
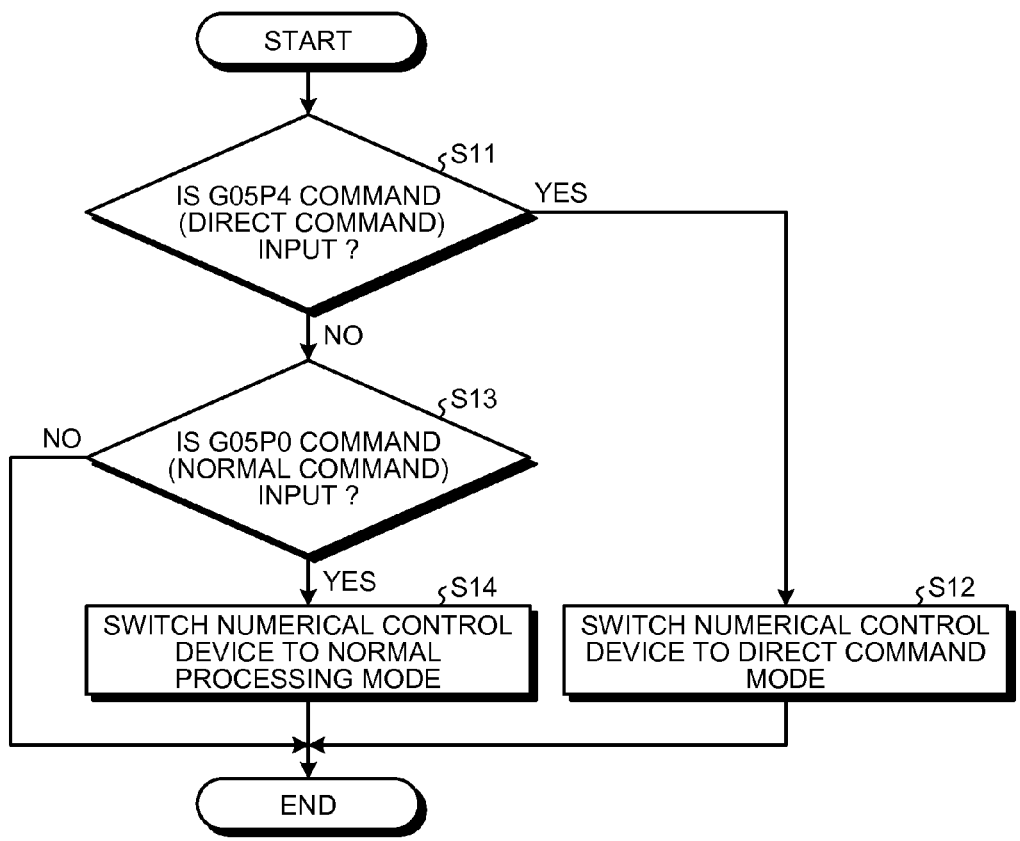
FIG. 4 is a flowchart illustrating the operation processing procedure when the operation mode of the numerical control device is switched on the basis of the machining program.

FIG. 4 is a flowchart illustrating the operation processing procedure when the operation mode of the numerical control device is switched on the basis of the machining program. When the mode switching command is made in the machining program 10, the mode switching command is input to the command input unit 11. This mode switching command is sent to the switching unit 13. The switching unit 13 determines whether a G05P4 command (direct command) is input as the mode switching command (Step S11).

When the mode switching command is a G05P4 command (Yes at Step S11), the switching unit 13 switches the numerical control device 1 to the direct command mode (Step S12). In contrast, when the mode switching command is not a G05P4 command (No at Step S11), the switching unit 13 determines whether a G05P0 command (normal command) is input as the mode switching command (Step S13).

When the mode switching command is a G05P0 command (Yes at Step S13), the switching unit 13 switches the numerical control device 1 to the normal processing mode (Step S14). In contrast, when the mode switching command is not a G05P0 command (No at Step S13), the switching unit 13 does not switch the operation mode.

In the numerical control device 1, the processes at Steps S11 to S14 are repeated during the operation of the machining program. Then, when a G05P4 command is input, the switching unit 13 switches the operation mode to the direct command mode. When a G05P0 command is input, the switching unit 13 switches the operation mode to the normal processing mode. Accordingly, the numerical control device 1 can switch between the normal processing mode and the direct command mode in real time.

Figure 5:
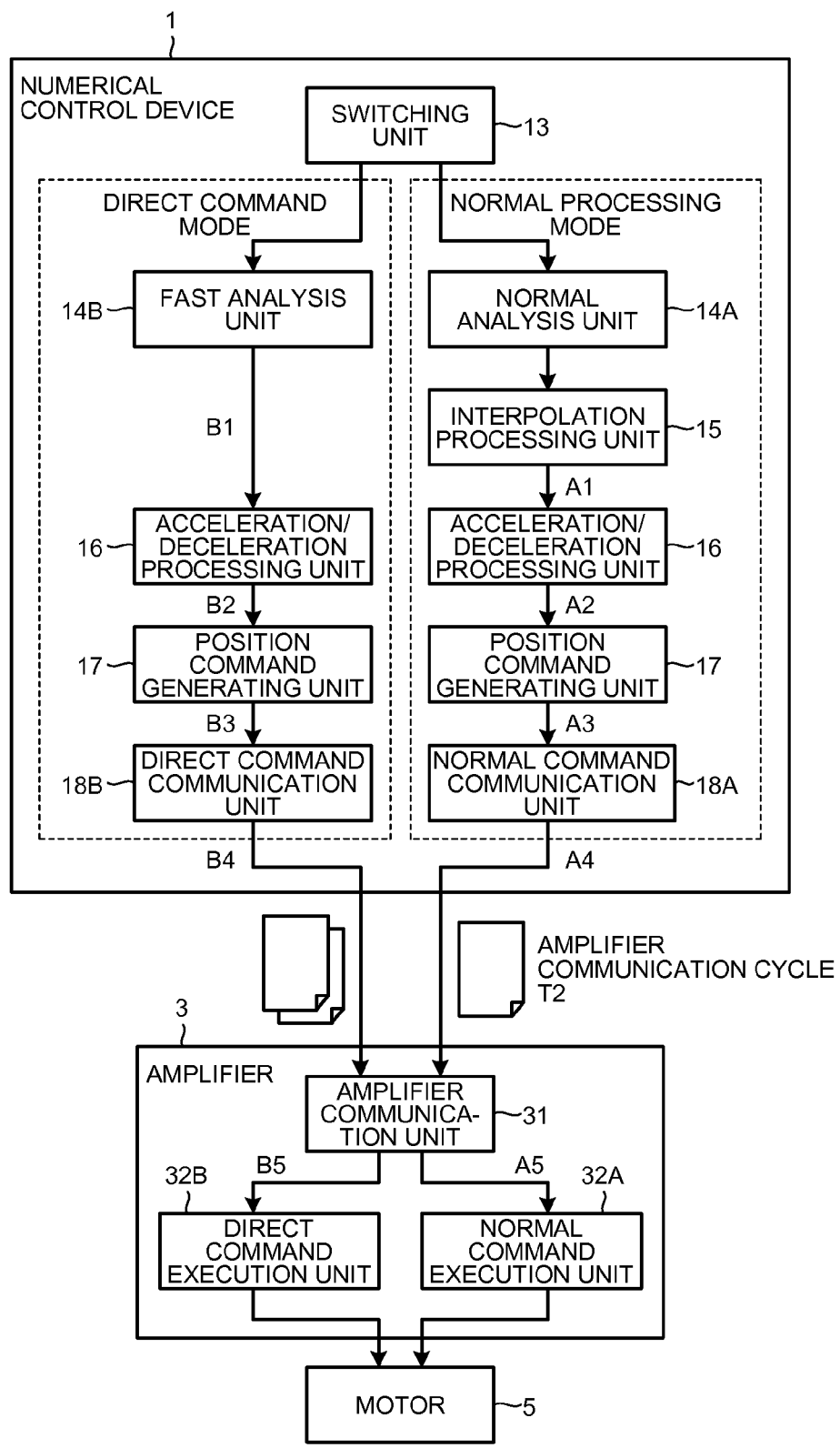
FIG. 5 is a diagram for explaining the processing procedure in the numerical control system.

FIG. 5 is a diagram for explaining the processing procedure in the numerical control system. When the direct command information or the normal processing information is input to the switching unit 13 of the numerical control device 1, the switching unit 13 controls the program input unit 12 and the position command generating unit 17 on the basis of the direct command information or the normal processing information.

When the normal processing information is input to the switching unit 13, the switching unit 13 switches the numerical control device 1 to the normal processing mode. In such a case, the normal analysis unit 14A analyzes the machining program 10 block by block and transmits the movement data on the machine tool extracted as a result of the analysis to the interpolation processing unit 15.

Then, the interpolation processing unit 15 performs the interpolation process to obtain the amount of feed during every interpolation cycle T1 in the normal processing mode on the basis of the movement data. The interpolation processing unit 15 transmits, to the acceleration/deceleration processing unit 16, the feed amount data obtained after the interpolation as the interpolated data A1.

The acceleration/deceleration processing unit 16 performs the acceleration/deceleration process on the basis of the interpolated data A1. The acceleration/deceleration processing unit 16 transmits, to the position command generating unit 17, the interpolated data A2 obtained after the acceleration/deceleration. The position command generating unit 17 generates the position command A3 by using the interpolated data A2 obtained after the acceleration/deceleration and received from the acceleration/deceleration processing unit 16. The position command A3 is generated every amplifier communication cycle T2. The position command generating unit 17 sends the generated position command A3 to the normal command communication unit 18A.

The normal command communication unit 18A transmits the position command A3 sent from the position command generating unit 17 to the amplifier 3 as the position command A4. The normal command communication unit 18A transmits the position command A4 to the amplifier communication unit 31 of the amplifier 3 every amplifier communication cycle T2.

When the amplifier communication unit 31 receives the position command A4 in the normal processing mode, the amplifier communication unit 31 converts the position command A4 into the position command A5 generated every intra-amplifier control cycle T3 and transmits it to the normal command execution unit 32A. The normal command execution unit 32A performs position control on the motor 5 every intra-amplifier control cycle T3 on the basis of the position command A5. Accordingly, the motor 5 operates according to the position command sent from the normal command execution unit 32A.

FIG. 6 is a diagram illustrating an example of position commands in the normal processing mode. In FIG. 6, the horizontal axis indicates the time and the vertical axis indicates the position command (movement amount data). The position command illustrated in the upper portion of FIG. 6 is the interpolated data A1 generated every interpolation cycle T1 in the normal processing mode. The position command illustrated in the middle portion of FIG. 6 is the position command A3 obtained after the acceleration/deceleration and generated every amplifier communication cycle T2. The position command illustrated in the lower portion of FIG. 6 is the position command A5 generated every intra-amplifier control cycle T3.

When the direct command information is input to the switching unit 13, the switching unit 13 switches the numerical control device 1 to the direct command mode. In such a case, the fast analysis unit 14B analyzes the machining program 10 block by block and transmits the movement data (feed amount data) of the machine tool extracted as a result of the analysis to the acceleration/deceleration processing unit 16 as the interpolated data B1. The interpolated data B1 is the data generated every interpolation cycle in the direct command mode. The interpolation cycle in the direct command mode is the cycle (T3), which is the same as the intra-amplifier control cycle. In the case of the direct command mode, interpolated data generated every intra-amplifier control cycle is directly written in the machining program 10; therefore, the numerical control device 1 does not perform the interpolation process.

The acceleration/deceleration processing unit 16 performs the acceleration/deceleration process on the basis of the interpolated data B1. The acceleration/deceleration processing unit 16 transmits, to the position command generating unit 17, the interpolated data B2 obtained after the acceleration/deceleration. The position command generating unit 17 generates the position command B3 by using the interpolated data B2 obtained after the acceleration/deceleration and received from the acceleration/deceleration processing unit 16. The position command B3 is the data generated every intra-amplifier control cycle T3. The acceleration/deceleration processing unit 16 sends the generated position command B3 to the direct command communication unit 18B.

The direct command communication unit 18B transmits the position command B3 sent from the position command generating unit 17 to the amplifier 3 as the position command B4 generated every intra-amplifier control cycle T3. The direct command communication unit 18B transmits the position commands B4 to the amplifier communication unit 31 of the amplifier 3 every amplifier communication cycle T2.

When the amplifier communication unit 31 receives the position command B4 in the direct command mode, the amplifier communication unit 31 transmits the position command B4 to the direct command execution unit 32B as the position command B5. The position command B5 is the data generated every intra-amplifier control cycle T3.

The direct command execution unit 32B performs position control on the motor 5 every intra-amplifier control cycle T3 on the basis of the position command B5. Accordingly, the motor 5 operates in accordance with the position command sent from the direct command execution unit 32B. As described above, in the case of the direct command mode, the position command B4 can be generated every intra-amplifier control cycle T3; therefore, the machining performance improves and thus accurate machining can be performed.

FIG. 7 is a diagram illustrating an example of position commands in the direct command mode. In FIG. 7, the horizontal axis indicates the time and the vertical axis indicates the position command (movement amount data). The position command illustrated in the upper portion of FIG. 7 is the interpolated data B1 generated every intra-amplifier control cycle T3 in the direct command mode. The position command illustrated in the lower portion of FIG. 7 is the position command B3 obtained after the acceleration/deceleration and generated every intra-amplifier control cycle T3. Although not illustrated, the position command B5 generated every intra-amplifier control cycle T3 is data similar to the position command B3 obtained after the acceleration/deceleration.

In the present embodiment, an explanation has been given of a case where the operation mode of the numerical control device 1 is switched on the basis of the setting of parameters, such as the initial mode parameter, and program commands; however, the switching unit 13 may switch the operation mode of the numerical control device 1 on the basis of a PLC (Programmable Logic Controller) signal. In such a case, the numerical control device 1 is configured to include a PLC device (not illustrated) and a PLC signal (command) output from the PLC device is input to the numerical control device 1. Therefore, the method of processing a command can be switched also by the PLC device. Accordingly, it is possible to determine which one of the normal processing mode and the direct command mode is selected as the initial state in advance by the machine tool that is equipped with the numerical control device 1.

When the amplifier communication cycle T2 is longer (slower) than the intra-amplifier control cycle T3, the direct command communication unit 18B may store a plurality of the position commands B4, each of which is generated every intra-amplifier control cycle T3, in a buffer and transfer the position commands B4 at the same time every amplifier communication cycle T2. In such a case, the direct command communication unit 18B and the amplifier communication unit 31 are each configured to include a buffer. When a plurality of the position commands B4 are collectively sent, the amplifier communication unit 31 restores the position commands B4 into the position command B4 every intra-amplifier control cycle T3 and sends it to the direct command execution unit 32B.

As described above, according to the embodiment, it is possible to send a position command generated every intra-amplifier control cycle T3, which is at least several times faster than the amplifier communication cycle T2, to hardware whose amplifier communication cycle T2 is slower than the intra-amplifier control cycle T3. In other words, in the case of the direct command mode, it becomes possible to perform the interpolation process every intra-amplifier control cycle T3, which is faster than the interpolation process in the case of the normal processing mode. Therefore, it is possible to control the machining to obtain accurate shapes at high speed. Moreover, in the case of the direct command mode, the acceleration/deceleration is taken into consideration in the position command; therefore, drive errors can be reduced and mechanical shock can be reduced. Accordingly, high-quality and accurate machining can be performed easily at high speed.

Moreover, because the acceleration/deceleration process is performed in the numerical control device 1, it becomes possible to easily perform machining on a different machine tool or controlled device with appropriate acceleration/deceleration and machine error correction. In other words, the machining program does not depend on motor characteristics and machine tool characteristics; therefore, even when the same machining program is executed with a different machine tool, it is possible to perform appropriate acceleration/deceleration and machine error correction. Moreover, because it is not necessary to take the acceleration/deceleration process and the machine error correction process into consideration when the machining program is created, the machining program 10 can be easily created.

Moreover, the direct command is not binary data but can be written in a machining program that can include normal program commands; therefore, it is not necessary to manage the data for performing a series of machinings as separate pieces of data. In other words, the direct commands and the normal program commands can be managed as one machining program. As a result, the machining program can be easily managed.

Moreover, because the numerical control device 1 performs the machine error correction process, for which pre-calculation is difficult, during machining, highly accurate machining can be realized. Moreover, the numerical control system switches between the normal processing mode and the direct command mode by using a PLC signal, a parameter, a program command (G code), or the like. Therefore, the operation mode can be set in advance according to the type of machine tool to be mounted and the operation mode can be switched in real time according to the machining application.

INDUSTRIAL APPLICABILITY

As described above, the numerical control device and the numerical control system according to the present invention are suitable for numerically controlling a machine tool using a numerical control

REFERENCE SIGNS LIST 1 numerical control device, 3 amplifier, 5 motor, 10 machining program, 11 command input unit, 12 program input unit, 13 switching unit, 14A normal analysis unit, 14B fast analysis unit, 15 interpolation processing unit, 16 acceleration/deceleration processing unit, 17 position command generating unit, 18A normal command communication unit, 18B direct command communication unit, 31 amplifier communication unit, 32A normal command execution unit, 32B direct command execution unit.

The invention claimed is:

1. A numerical control device comprising:
a switching unit that switches between a first processing mode in which a first position command for an amplifier, which drives a motor, is generated by performing an interpolation process performed every interpolation cycle and an acceleration/deceleration process on a program command in a program, and a second processing mode in which a position command for the amplifier is generated as a second position command generated every intra-amplifier control cycle by performing the acceleration/deceleration process on a command that is generated every intra-amplifier control cycle, which is a control cycle in the amplifier and is a shorter cycle than the interpolation cycle;
a first analysis unit that extracts movement data on a machine tool by analyzing the program command when the numerical control device operates in the first processing mode;
an interpolation processing unit that obtains first interpolated data by performing the interpolation process on the movement data when the numerical control device operates in the first processing mode;
a second analysis unit that extracts interpolated movement data as second interpolated data by analyzing the program command when the numerical control device operates in the second processing mode;
an acceleration/deceleration processing unit that performs the acceleration/deceleration process on the first interpolated data when the numerical control device operates in the first processing mode, and performs the acceleration/deceleration process on the second interpolated data when the numerical control device operates in the second processing mode; and
a position command generating unit that generates the first position command for the amplifier by using the first interpolated data on which the acceleration/deceleration process is performed when the numerical control device operates in the first processing mode, and generates the second position command for the amplifier by using the second interpolated data on which the acceleration/deceleration process is performed when the numerical control device operates in the second processing mode.

2. The numerical control device according to claim 1, wherein, when the numerical control device operates in the second processing mode, the acceleration/deceleration processing unit performs the acceleration/deceleration process corresponding to a characteristic of the amplifier or a characteristic of a controlled device on the second interpolated data.

3. The numerical control device according to claim 1, wherein the position command generating unit calculates an amount of machine error correction by using a preset parameter and generates the second position command by using the calculated amount of machine error correction.

4. The numerical control device according to claim 1, wherein the switching unit switches between the first processing mode and the second processing mode on a basis of any of a preset parameter, an operation command in a machining program, and a command transmitted from a PLC device.

5. A numerical control system comprising:
a numerical control device;
an amplifier that is controlled by the numerical control device; and
a motor that is driven by the amplifier,
wherein the numerical control device includes:
a switching unit that switches between a first processing mode in which a first position command for the amplifier, which drives the motor, is generated by performing an interpolation process performed every interpolation cycle and an acceleration/deceleration process on a program command in a program, and a second processing mode in which a position command for the amplifier is generated as a second position command generated every intra-amplifier control cycle by performing the acceleration/deceleration process on a command that is generated every intra-amplifier control cycle, which is a control cycle in the amplifier and is a shorter cycle than the interpolation cycle,
a first analysis unit that extracts movement data on a machine tool by analyzing the program command when the numerical control device operates in the first processing mode,
an interpolation processing unit that obtains first interpolated data by performing the interpolation process on the movement data when the numerical control device operates in the first processing mode,
a second analysis unit that extracts interpolated movement data as second interpolated data by analyzing the program command when the numerical control device operates in the second processing mode,
an acceleration/deceleration processing unit that performs the acceleration/deceleration process on the first interpolated data when the numerical control device operates in the first processing mode, and performs the acceleration/deceleration process on the second interpolated data when the numerical control device operates in the second processing mode,
a position command generating unit that generates the first position command for the amplifier by using the first interpolated data on which the acceleration/deceleration process is performed when the numerical control device operates in the first processing mode, and generates the second position command for the amplifier by using the second interpolated data on which the acceleration/deceleration process is performed when the numerical control device operates in the second processing mode,
a first communication processing unit that, when the numerical control device operates in the first processing mode, transmits the first position command to the amplifier every communication cycle of the amplifier, which is a communication control cycle when communication is performed with the amplifier and is a longer cycle than the intra-amplifier control cycle, and
a second communication processing unit that, when the numerical control device operates in the second processing mode, transmits the second position command to the amplifier every communication cycle of the amplifier, and
wherein the amplifier includes:

an amplifier communication unit that receives the first and second position commands, a first execution unit that, when the first position command is received, converts the first position command into a position command generated every intra-amplifier control cycle and controls the motor, and a second execution unit that, when the second position command is received, controls the motor every intra-amplifier control cycle.

* * * * *